United States Patent
Asanovic et al.

(10) Patent No.: US 11,048,515 B2
(45) Date of Patent: Jun. 29, 2021

(54) WAY PREDICTOR AND ENABLE LOGIC FOR INSTRUCTION TIGHTLY-COUPLED MEMORY AND INSTRUCTION CACHE

(71) Applicant: SiFive, Inc., San Mateo, CA (US)

(72) Inventors: Krste Asanovic, Berkeley, CA (US); Andrew Waterman, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 16/553,839

(22) Filed: Aug. 28, 2019

(65) Prior Publication Data

US 2020/0210189 A1 Jul. 2, 2020

Related U.S. Application Data

(60) Provisional application No. 62/785,947, filed on Dec. 28, 2018.

(51) Int. Cl.
*G06F 9/38* (2018.01)
*G06F 12/0875* (2016.01)

(52) U.S. Cl.
CPC ........ *G06F 9/3802* (2013.01); *G06F 12/0875* (2013.01); *G06F 2212/452* (2013.01)

(58) Field of Classification Search
CPC .................................................. G06F 9/3802
See application file for complete search history.

(56) References Cited

U.S. PATENT DOCUMENTS

| | | | |
|---|---|---|---|
| 5,276,882 A | 1/1994 | Emma et al. | |
| 5,781,752 A | 7/1998 | Moshovos et al. | |
| 6,026,479 A * | 2/2000 | Fisher | G06F 9/30076 712/215 |
| 6,505,292 B1 | 1/2003 | Witt | |
| 7,814,299 B2 | 10/2010 | Hickey et al. | |
| 7,849,310 B2 | 12/2010 | Watt et al. | |

(Continued)

OTHER PUBLICATIONS

C. Carruth; "RFC: Speculative Load Hardening (a Spectre variant #1 mitigation)"; Mar. 23, 2018, 21 pages; https://lists.llvm.org/pipermail/llvm-dev/2018-March/122085.html.

(Continued)

*Primary Examiner* — Jacob Petranek
(74) *Attorney, Agent, or Firm* — Young Basile Hanlon & MacFarlane, P.C.

(57) ABSTRACT

Disclosed herein are systems and method for instruction tightly-coupled memory (iTIM) and instruction cache (iCache) access prediction. A processor may use a predictor to enable access to the iTIM or the iCache and a particular way (a memory structure) based on a location state and program counter value. The predictor may determine whether to stay in an enabled memory structure, move to and enable a different memory structure, or move to and enable both memory structures. Stay and move predictions may be based on whether a memory structure boundary crossing has occurred due to sequential instruction processing, branch or jump instruction processing, branch resolution, and cache miss processing. The program counter and a location state indicator may use feedback and be updated each instruction-fetch cycle to determine which memory structure(s) needs to be enabled for the next instruction fetch.

8 Claims, 7 Drawing Sheets

(56) References Cited

U.S. PATENT DOCUMENTS

| | | | |
|---|---|---|---|
| 8,117,403 | B2 | 2/2012 | Heller, Jr. et al. |
| 9,063,721 | B2 | 6/2015 | Ghose |
| 2004/0030838 | A1* | 2/2004 | van de Waerdt ..... G06F 9/3832 711/137 |
| 2006/0095747 | A1 | 5/2006 | Nancekievill |
| 2006/0248319 | A1 | 11/2006 | Kadambi |
| 2007/0113013 | A1* | 5/2007 | Knoth ................ G06F 9/30189 711/128 |
| 2007/0255927 | A1 | 11/2007 | Vasekin et al. |
| 2008/0082753 | A1* | 4/2008 | Licht .................... G06F 9/3814 711/128 |
| 2009/0063221 | A1 | 3/2009 | Jonath et al. |
| 2009/0204785 | A1 | 8/2009 | Yates, Jr. et al. |
| 2011/0320793 | A1 | 12/2011 | Bell, Jr. et al. |
| 2014/0337605 | A1* | 11/2014 | Hall ...................... G06F 9/3806 712/239 |
| 2015/0100762 | A1* | 4/2015 | Jacobs ................ G06F 12/0864 712/207 |
| 2016/0299700 | A1* | 10/2016 | Day ................... G06F 12/0842 |
| 2018/0225255 | A1 | 8/2018 | Kang et al. |

OTHER PUBLICATIONS

C. Williams; "Three more data-leaking security holes found in Intel chips as designers swap security for speed"; Aug. 14, 2018, pp. 1-12; https://www.theregister.co.uk/2018/08/14/intel_l1_terminal_fault_bugs/.

V. Kiriansky, et al.; "Speculative Buffer Overflows: Attacks and Defenses"; Jul. 10, 2018; pp. 1-12.

J. Renau; "Securing Processors from Time Side Channels"; UC Santa Cruz; Apr. 4, 2018; 20 pages; https://escholarship.org/uc/item/6j02r9pw.

K. Khasawneh, et al.; "SafeSpec: Banishing the Spectre of a Meltdown with Leakage-Free Speculation"; Jun. 16, 2018, 12 pages.

M. Schwarz, et al.; "NetSpectre: Read Arbitrary Memory over Network"; Jul. 2018; 14 pages.

X. Dong, et al.; "Spectres, Virtual Ghosts, and Hardware Support"; HASP; Jun. 2, 2018; Los Angeles, CA; 9 pages.

G. Chen, et al.; "SGXPECTRE Attacks: Stealing Intel Secrets from SGX Enclaves via Speculative Execution"; Jun. 3, 2018; 16 pages.

C. Canella, et al.; "A Systematic Evaluation of Transient Execution Attacks and Defenses"; Nov. 13, 2018; 16 pages.

C. Celio, et al.; "Securing High-performance RISC-V Processors from Time Speculation"; Esperanto Technologies; 8th RISC-V Workshop, Barcelona, Spain; May 7, 2018; 29 pages.

International Search Report and Written Opinion for International application No. PCT/US2019/021998 dated May 30, 2019.

International Search report and Written Opinion for International Application No. PCT/US2019065849 dated Feb. 24, 2020.

SiFive. "SiFive U54-MC Core Complex Manual v1p0." Oct. 4, 2017 (Oct. 4, 2017) Retrieved on Feb. 9, 2020 (Feb. 9, 2020) from <https://static.dev.sifive.com/U54-MC-RVCoreIP.pdf>; entire document.

K. Asanovic; CS 152 Computer Architecture and Engineering; CS252 Graduate Computer Architecture; Lecture 13—Advanced Out-of-Order Superscalars and Introduction to VLIW; Electrical Engineering and Computer Sciences, University of California at Berkeley; Mar. 2018; 39 pages.

M. Yan, et al.; "InvisiSpec: Making Speculative Execution Invisible in the Cache Hierarchy"; Oct. 2018; 14 pages.

V. Kiriansky, et al.; "DAWG: A Defense Against Cache Timing Attacks in Speculative Execution Processors"; Dec. 2018; 14 pages.

* cited by examiner

WAY PREDICTOR AND ENABLE LOGIC FOR INSTRUCTION TIGHTLY-COUPLED MEMORY AND INSTRUCTION CACHE

CROSS-REFERENCE TO RELATED APPLICATION(S)

This application claims priority to and the benefit of U.S. Provisional Application Patent Ser. No. 62/785,947, filed Dec. 28, 2018, the entire disclosure of which is hereby incorporated by reference.

TECHNICAL FIELD

This disclosure relates to access prediction between an instruction tightly-coupled memory and an instruction cache to fetch an instruction.

BACKGROUND

Instruction fetch times between a processor and off-chip memory systems or main memory are generally much slower than processor execution times. Processors therefore employ instruction caches and instruction tightly-coupled memory to improve system performance. Both types of memory improve latency and reduce power consumption by reducing off-chip memory accesses. However, processors use significant power by having to search through both the instruction caches and instruction tightly-coupled memory for each instruction fetch. Moreover, this may increase latency and reduce system performance.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
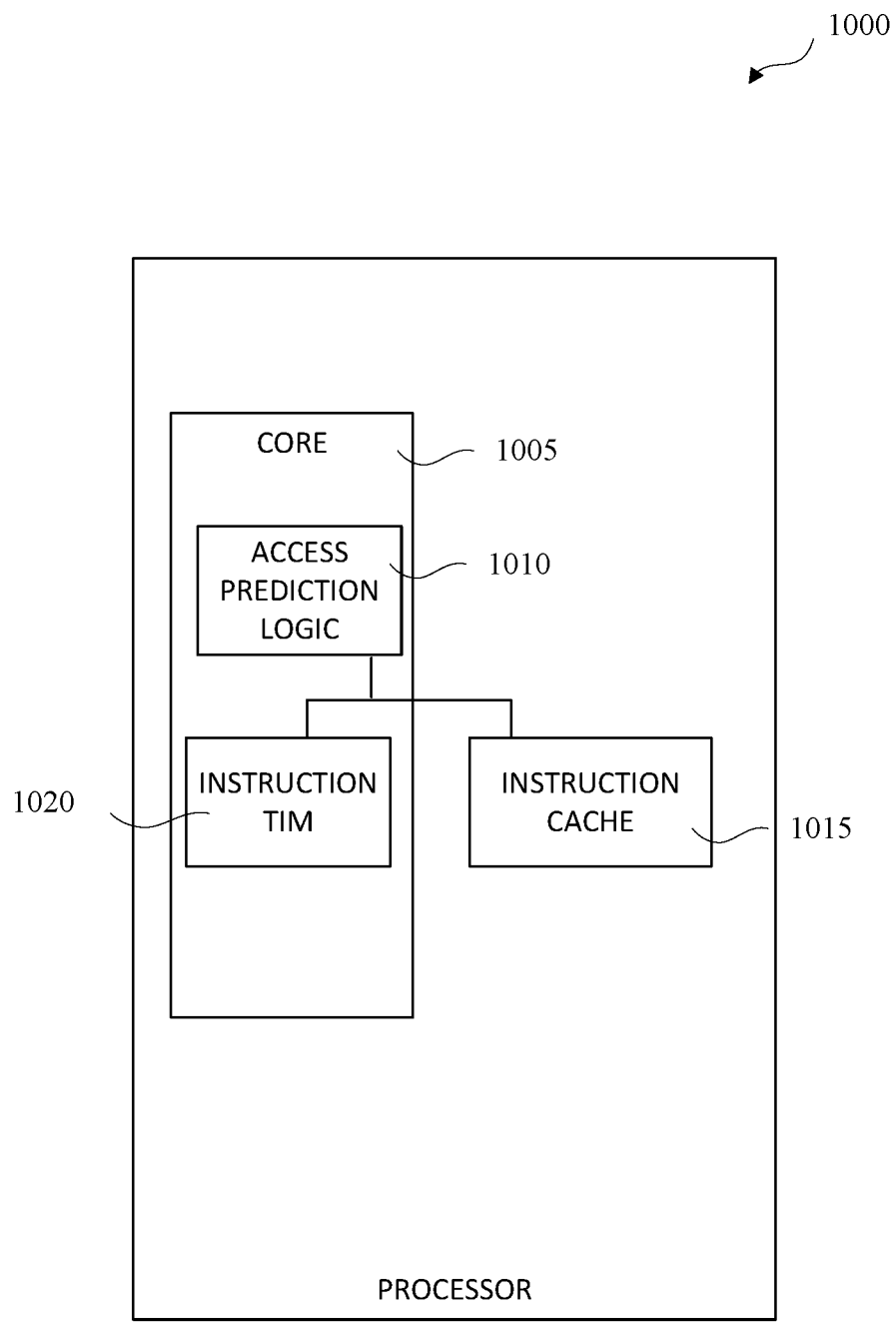
FIG. 1 is a block diagram of an example of a processor including an access prediction logic for enabling one of an instruction cache (iCache) or an instruction tightly-coupled memory (iTIM) in accordance with embodiments of this disclosure.

Disclosed herein are systems and method for instruction tightly-coupled memory (iTIM) and instruction cache (iCache) access prediction. Implementations described herein may be used to eliminate or mitigate the need to access both the iTIM and iCache when fetching an instruction.

Processors may employ iTIMs and N-way set-associative iCaches to improve system performance when fetching instructions. To minimize the instruction-fetch latency, the iTIM and the N ways of the iCache can be accessed in parallel, before it is known whether the iTIM or the N-way set-associative iCache contains the desired instruction. Power consumption may be reduced by employing location state feedback during an instruction fetch. The use of feedback may enable the processor to achieve higher performance and/or lower power consumption by accessing one of the iTIM or iCache (and a particular way) as opposed to accessing both the iTIM and the N ways of the iCache.

A processor may use an access prediction logic or predictor to send an enable signal to access the iTIM or the iCache and a particular way based on a location state and program counter value. The access prediction logic may determine whether to stay in an enabled memory structure, move to and enable a different memory structure, or move to and enable both memory structures. Stay and move predictions may be based on whether a memory structure boundary crossing has occurred due to sequential instruction processing, branch or jump instruction processing, branch resolution, and cache miss processing, where a memory structure is one of the iTIM or iCache and a particular way. The program counter and a location state indicator may use feedback and be updated each instruction-fetch cycle to determine which memory structure(s) needs to be enabled for the next instruction fetch.

These and other aspects of the present disclosure are disclosed in the following detailed description, the appended claims, and the accompanying figures.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

FIG. 1 is a block diagram of an example of a processor 1000 with a core 1005, which includes an access prediction logic or access predictor 1010 for accessing one of an instruction cache (iCache) 1015 or an instruction tightly-coupled memory (iTIM) 1020 (may be referred to as memory structure or memory structures as appropriate) in accordance with embodiments of this disclosure. In an implementation, the iTIM 1020 may be a part of the core 1005. For example, the processor 1000 may be a compute device, a microprocessor, a microcontroller, or an IP core. The processor 1000 may be implemented as an integrated circuit. The processor 1000 may include one or more cores, and each core may include multiple iTIMs and iCaches. In an implementation, the iTIM 1020 may be a part of the core 1005. The access prediction logic 1010 described herein may be implemented or modified appropriately without departing from the scope of the disclosure, claims, or drawings to account for different combinations of cores, iTIMs and iCaches. The processor 1000 may be configured to decode and execute instructions of an instruction set architecture (ISA) (e.g., a RISC-V instruction set). The processor 1000 may implement a pipelined architecture. In an implementation, the iTIM 1020 may be a low-latency, dedicated RAM having a defined size and configured to have a memory address range. In an implementation, the iCache 1015 may be an N-way set-associative cache having a fixed cache line length, and each cache way having a defined size. The iCache 1015 may have a defined size and configured to have a memory address range.

The processor 1000 may include the access prediction logic 1010 to improve power consumption when fetching instructions for execution in the pipelined architecture. The access prediction logic 1010 may be updated each instruction-fetch cycle to determine which memory structure(s) to enable. In an implementation, the access prediction logic 1010 may use feedback from a previous instruction-fetch cycle to indicate if the iTIM, the iCache plus which way, or both memory structures need to be enabled. The access prediction logic 1010 may process a location state and a program counter value and output an enable signal to enable the iTIM, the iCache plus which way or both. In an implementation, the access prediction logic 1010 may account for memory structure boundary crossings. In an implementation, the access prediction logic 1010 may include sequential instruction processing logic to account for sequential instruction processing. For example, the sequential instruction processing logic may address consequences for crossing boundary conditions with respect to the current memory structure enabled by the location state. For example, a boundary condition may include a target memory address going beyond the memory address range of the current memory structure. In an implementation, if a boundary crossing condition occurs and if the current memory structure is the iTIM, the location state indicator may indicate to activate both the iTIM and iCache. In an implementation, if a boundary crossing condition occurs and if the current memory structure is the iCache, a cache prediction algorithm may be used to determine and update the location state. In an implementation, the access prediction logic 1010 may include a branch predictor, a branch history table, a branch target buffer, and/or a return address stack predictor to account for branch or jump conditions or scenarios which may impact the location state and the program counter value. In an implementation, the access prediction logic 1010 may account for branch mispredictions which may impact the location state and the program counter value. For example, the location state may now be unknown due to the misprediction and the location state indicator may be set to activate the iCache with all ways or both the iTIM and iCache.

Figure 2:
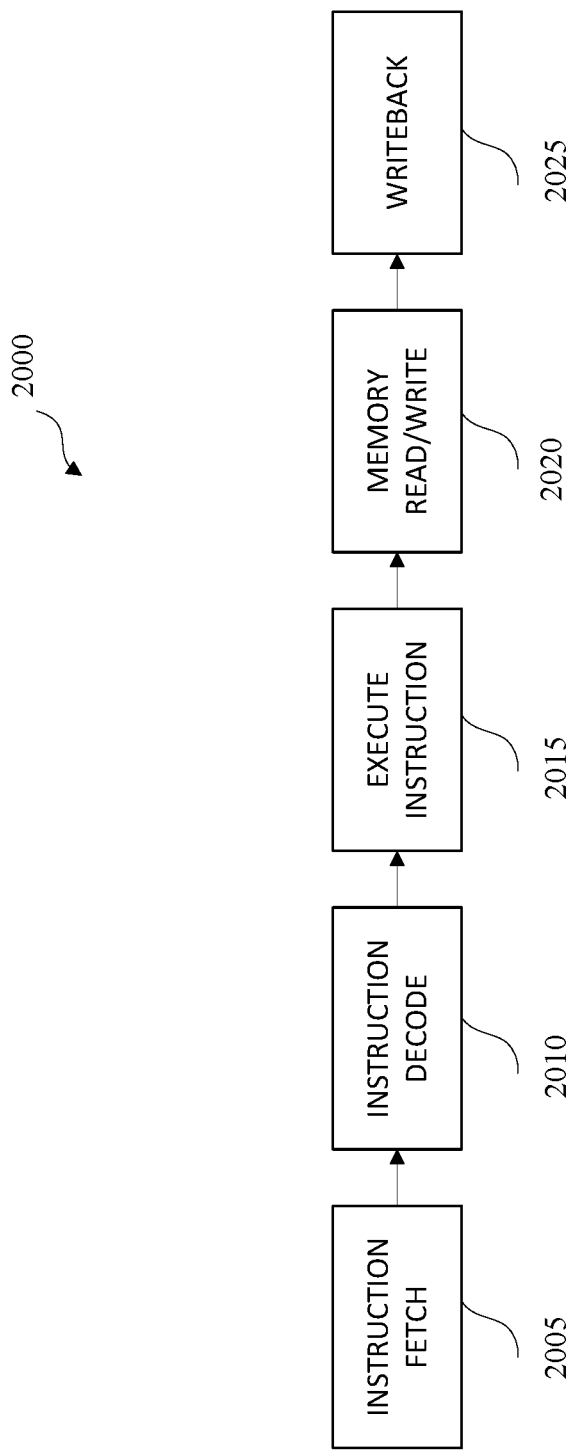
FIG. 2 is a diagram of an example core pipeline of a processor in accordance with embodiments of this disclosure.
Figure 3:
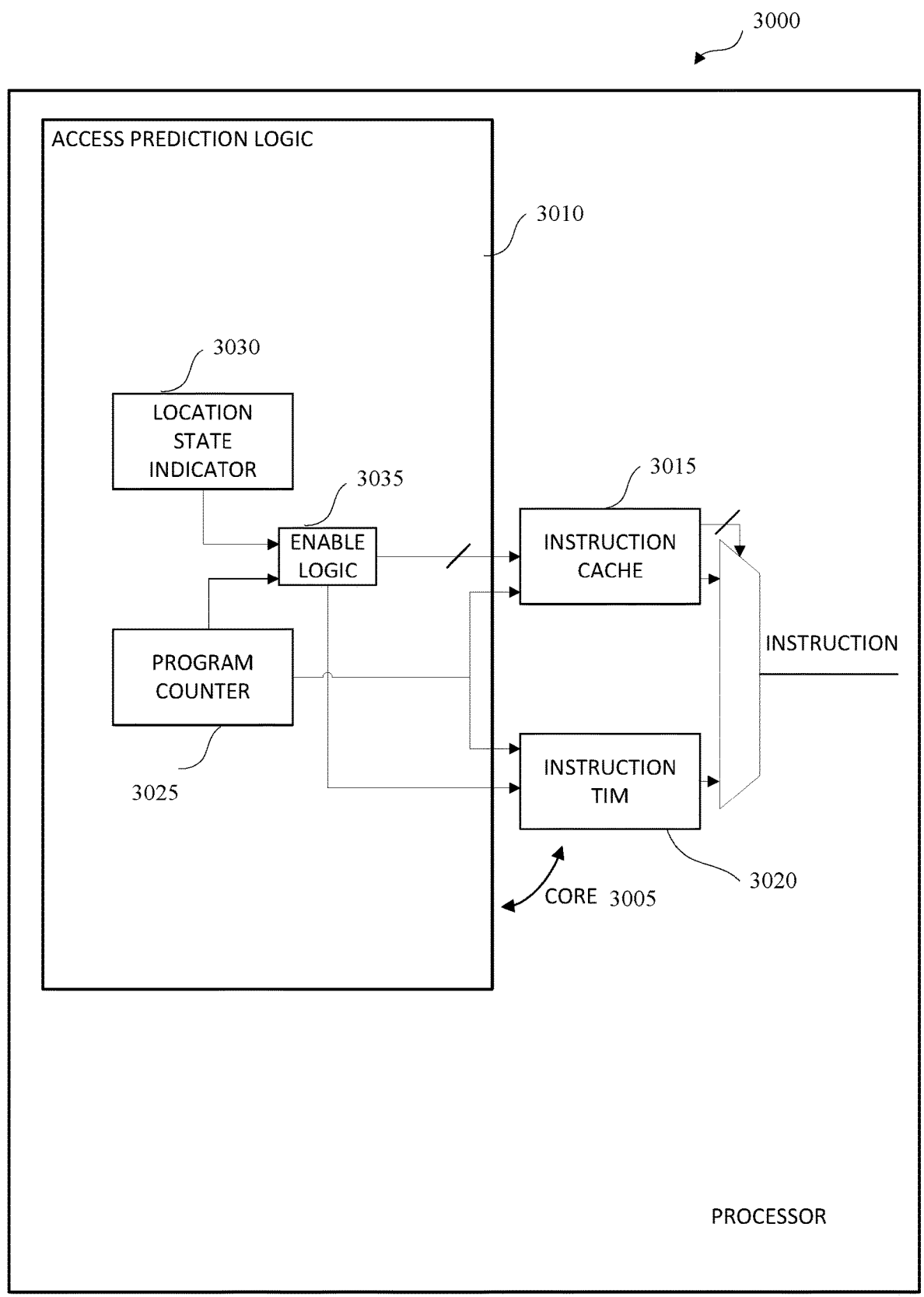
FIG. 3 is a diagram of an example flow and predictor in accordance with embodiments of this disclosure.
Figure 5:
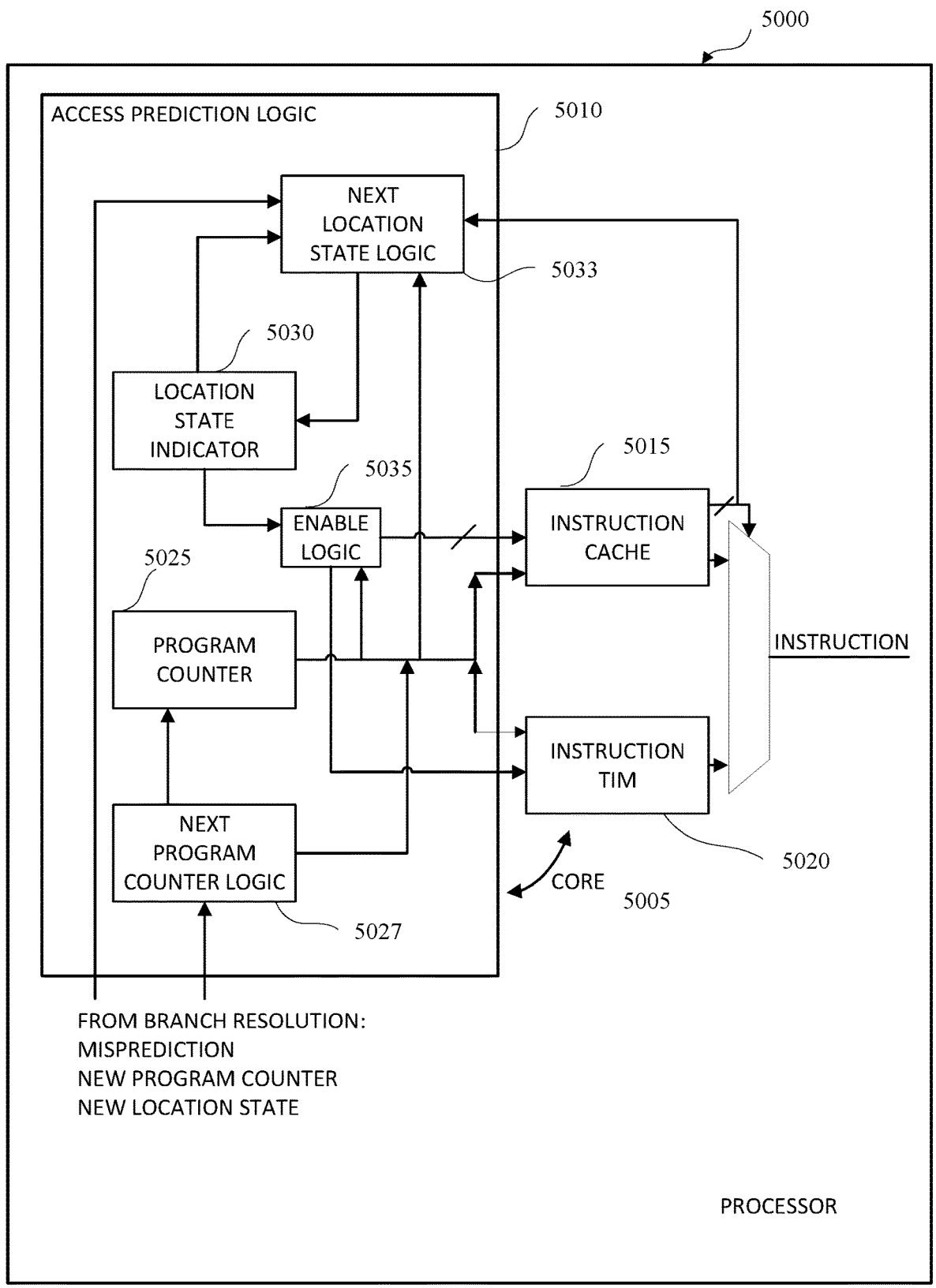
FIG. 5 is a diagram of an example flow and predictor in accordance with embodiments of this disclosure.

FIG. 2 is a diagram of an example core pipeline 2000 of a processor, such as the processor 1000 of FIG. 1, processor 3000 of FIG. 3 and processor 5000 of FIG. 5, in accordance with embodiments of this disclosure. The core pipeline 2000 may have five pipeline stages for instruction execution including instruction fetch stage 2005, instruction decode stage 2010, execute instruction stage 2015, memory read/write stage 2020 and writeback stage 2025. In some implementations, the core pipeline 2000 may include fewer or more pipeline stages without departing from the scope of the disclosure, claims or drawings described herein. The term "instruction-fetch cycle" as used herein refers to one iteration of the fetch phase or stage of instruction execution.

In the instruction fetch stage 2005, an instruction is fetched from the iTIM, the iCache or memory as appropriate. The access prediction logic described herein, for example the access prediction logic 1010 of FIG. 1, access prediction logic 3010 of FIG. 3 or access prediction logic 5010 of FIG. 5, may, in part, be performed, executed or processed during the instruction fetch stage 2005. For example, the program counter may be incremented or updated based on an instruction type processing and the location state may be updated based on instruction type processing and hit/miss conditions with respect to an instruction cache.

The fetched instruction may then be decoded in the instruction decode stage 2010 and executed in the execution stage 2015. The access prediction logic described herein, for example the access prediction logic 1010 of FIG. 1, access prediction logic 3010 of FIG. 3 or access prediction logic 5010 of FIG. 5, may, in part, be updated during the execution stage 2015 for branch resolution. For example, in the event of a branch misprediction, the access prediction logic may be updated with a branch misprediction event, a new program counter value and a new location state. The access prediction logic may then use this updated information to set which memory structure(s) should be enabled. A read or write to the memory address may occur during the memory read/write stage 2020 depending on the instruction type and a result may be written to a register during the writeback stage 2025.

FIG. 3 is a diagram of an example flow and access prediction logic 3010 in accordance with embodiments of this disclosure. FIG. 3 shows a processor 3000 with a core 3005, which includes the access prediction logic or access predictor 3010 for accessing one of an instruction cache (iCache) 3015 or an instruction tightly-coupled memory (iTIM) 3020 in accordance with embodiments of this disclosure and may be implemented and configured as described herein. In an implementation, the iTIM 3020 may be a part of the core 3005. For example, the processor 3000 may be a compute device, a microprocessor, a microcontroller, or an IP core. The processor 3000 may be implemented as an integrated circuit. The processor 3000 may include one or more cores, and each core may include multiple iTIMs and iCaches as described herein. The access prediction logic 3010 described herein may be implemented or modified appropriately for all combinations without departing from the scope of the disclosure, claims or drawings. The processor 3000 may be configured to decode and execute instructions of an instruction set architecture (ISA) (e.g., a RISC-V instruction set). The processor 3000 may implement a pipelined architecture as shown, for example in FIG. 2. The processor 3000 may include the access prediction logic 3010 to reduce power consumption when fetching instructions for execution in the pipelined architecture.

The access prediction logic 3010 may include a program counter 3025, a location state indicator 3030 and an enable logic 3035. The location state indicator 3030 may set a location state to activate the iTIM, the iCache plus a particular way, the iCache plus all ways when the location state is unknown (referred to as unknown state herein), or both the iTIM and iCache when the location state is unknown. The location state indicator 3030 may send the location state to the enable logic 3010. In an implementation, the location state indicator 3030 may use feedback from a previous instruction-fetch cycle to set the location state. In an implementation, the location state may be set to an unknown state upon initialization, due to boundary crossings from sequential instruction logic processing, due to branch or jump instruction type processing, due to branch misprediction or due to a cache miss. In an implementation, the location state indicator 3030 may use branch resolution information to set or update the location state. For example, the branch resolution information may include a branch misprediction event, a new program counter value and a new location state. In an implementation, the location state indicator 3030 may use branch prediction logic to update the location state. In an implementation, the location state indicator 3030 may use a cache hit/miss to update the location state. In an implementation, the location state indicator 3030 may be updated each instruction-fetch cycle.

The program counter 3025 may retain the memory address of instructions as the instructions are fetched from memory and executed (also referred to as the program counter value). The program counter 3025 may include an incrementer, a selector and a register. Upon decoding of a fetched instruction, the address of the next sequential instruction is formed by adding the byte length of the current instruction to the current program counter value using the incrementer and placing this next sequential instruction in the register. In the event a branch is taken, the address of the target instruction is selected by the selector instead of the incremented value and this target address is placed in the register. For example, the program counter 3025 may be updated with the branch resolution information or from the branch prediction logic. The program counter 3025 may send the program counter value to the enable logic 3010. In an implementation, the program counter 3025 may be updated each instruction-fetch cycle.

The enable logic 3035 processes inputs from the program counter 3025 and the location state indicator 3030 and enables the iTIM, the iCache and appropriate way, or both in the event of an unknown state. In an implementation, the access prediction logic 3010 may include sequential instruction processing logic and branch prediction processing as described herein. For example, the access prediction logic 3010 may include a branch predictor, a branch history table, a branch target buffer, and/or a return address stack predictor to account for branch or jump conditions or scenarios which may impact the location state indicator 3030 and the program counter 3025. In an implementation, the access prediction logic 3010 may account for branch mispredictions which may impact the location state indicator 3030 and the program counter 3025.

In an implementation, the activated iTIM 3020, or iCache 3015 and appropriate way may return the instruction for decoding in the decode instruction stage as shown in FIG. 2 and the location state indicator 3030 may be updated appropriately. In this implementation, in the event of a cache miss, the instruction may be obtained from main memory for example, and the location state indicator 3030 may be updated appropriately. In an implementation, the location state indicator 3030 may set the location state to unknown, i.e. both the iTIM 3020 and iCache 3015 may be set for activation.

In an implementation, the enable logic 3035 may activate both memory structures when an unknown state is indicated and an appropriate memory structure may return the instruction for decoding in the decode instruction stage as shown in FIG. 2. In an implementation, the location state indicator 3030 may be updated appropriately. In this implementation, in the event of a cache miss, the instruction may be obtained from main memory for example, and the location state indictor 3030 may be updated appropriately.

Figure 4:
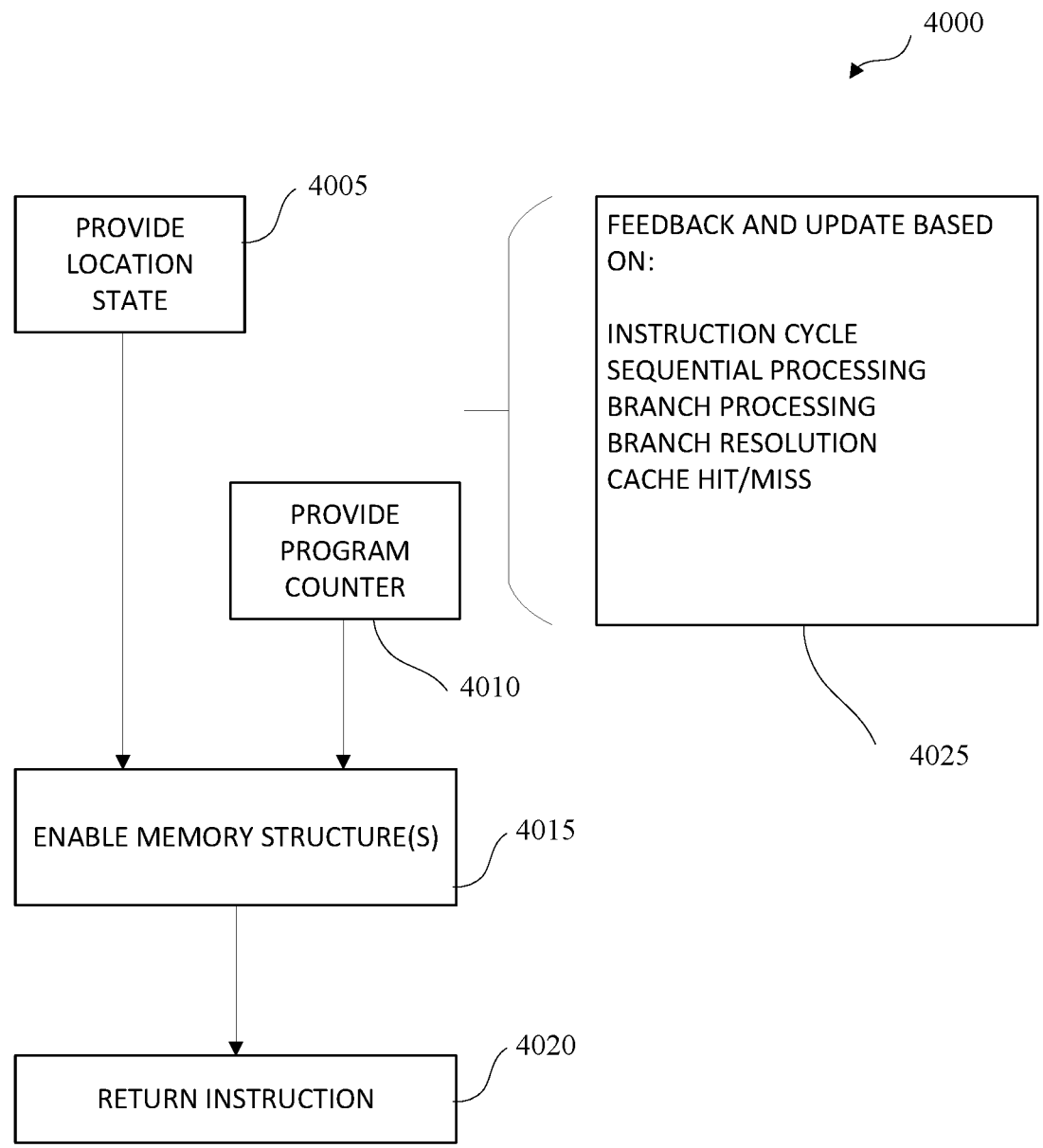
FIG. 4 is a diagram of an example technique for access prediction between an iTIM and an iCache as shown in FIG. 3 in accordance with embodiments of this disclosure.

FIG. 4 is a diagram of an example technique 4000 for access prediction between an iTIM and an iCache as shown in FIG. 3 in accordance with embodiments of this disclosure. The technique includes: providing 4005 a location state for a current instruction cycle; providing 4010 a program counter value; enabling 4015 a memory structure(s) based on processing of the location state and the program counter value; returning 4020 an instruction; and updating 4025 the location state and the program counter value. The technique 4000 may be implemented using the processor 1000 of FIG. 1, the processor 3000 of FIG. 3 or the processor 5000 of FIG. 5.

The technique 4000 includes providing 4005 a location state for the current instruction cycle. In an implementation, the location state may be known or unknown. In an implementation, when the location state is known, the location state indicator may indicate either the iTIM or the iCache and a particular way. In an implementation, when the location state is unknown, the location state indicator may indicate the iCache and all ways, or both the iTIM and the iCache and all ways. The iTIM may be the iTIM shown for example in FIG. 1, FIG. 3, or FIG. 5, for example. The iCache may be the iCache shown for example in FIG. 1, FIG. 3, or FIG. 5, for example.

The technique 4000 includes providing 4010 a program counter value.

The technique 4000 includes enabling 4015 a memory structure(s) based on processing the location state and the program counter value. In an implementation, the memory structure enabled may be the iTIM. In an implementation, the memory structure enabled may be the iCache and a particular way. In an implementation, when the location state is unknown, the memory structure enabled may include the iCache with all ways enabled. In an implementation, when the location state is unknown, the memory structure enabled may include the iTIM and the iCache with all ways enabled.

The technique 4000 includes returning 4020 an instruction. In an implementation, the instruction may be returned from an enabled and known memory structure. For example, in the event the location state was known, the instruction may be returned from the iTIM or the particular way in the iCache. In an implementation, the instruction may fail to return from an enabled and known memory structure and may be returned from main memory or some other memory hierarchy, for example. In this instance, the enabled and known memory structure may have been the iCache and there was a cache miss. In an implementation, the instruction may be returned from an enabled memory structure. For example, in the event the location state was unknown and both the iTIM and the iCache with all ways were enabled, the instruction may be returned from one of the iTIM or a way in the iCache. In an implementation, the instruction may be returned from memory not including the iTIM and the iCache, for example, main memory or some other memory hierarchy.

The technique 4000 includes updating 4025 the location state indicator and the program counter. In an implementation, the location state indicator and the program counter may be updated each instruction-fetch cycle with feedback regarding the location state and program counter value, as appropriate. In an implementation, the location state indicator and the program counter may be updated based on sequential instruction processing as described herein. In an implementation, the location state indicator and the program counter may be updated based on branch processing as described herein. In an implementation, the location state indicator and the program counter may be updated based on branch resolution as described herein. In an implementation, the location state indicator and the program counter may be updated based on cache hit/miss processing as described herein.

FIG. 5 is a diagram of an example flow and access prediction logic 5010 in accordance with embodiments of this disclosure. FIG. 5 shows a processor 5000 with a core 5005, which includes the access prediction logic or access predictor 5010 for accessing one of an instruction cache (iCache) 5015 or an instruction tightly-coupled memory (iTIM) 5020 in accordance with embodiments of this disclosure and may be implemented and configured as described herein. In an implementation, the iTIM 5020 may be a part of the core 5005. For example, the processor 5000 may be a compute device, a microprocessor, a microcontroller, or an IP core. The processor 5000 may be implemented as an integrated circuit. The processor 5000 may include one or more cores, and each core may include multiple iTIMs and iCaches. The access prediction logic 5010 described herein may be implemented or modified appropriately for all combinations without departing from the scope of the disclosure, claims or drawings. The processor 5000 may be configured to decode and execute instructions of an instruction set architecture (ISA) (e.g., a RISC-V instruction set). The processor 5000 may implement a pipelined architecture as shown, for example in FIG. 2. The processor 5000 may include the access prediction logic 5010 to reduce power consumption when fetching instructions for execution in the pipelined architecture.

The access prediction logic 5010 may include a program counter 5025, a next program counter logic 5027, a location state indicator 5030, a next location state logic 5033 and an enable logic 5035. The program counter 5025 may be an input to the next program counter logic 5027, the next location state logic 5033, the enable logic 5035, the iTIM 5020 and the iCache 5015. The next program counter logic 5027 may be an input to the program counter 5025. The location state indicator 5030 may be an input to the enable logic 5035 and the next location state logic 5033. The next location state logic 5033 may be an input to the location state indicator 5030. The enable logic 5035 may be an input to the iTIM 5020 and the iCache 5015 including a particular way.

The location state indicator 5030 may indicate two known states, an iTIM state and an iCache state, and an unknown state. The location state indicator 5030 may send the location state to the enable logic 5010. In an implementation, the location state indicator 5030 may be updated by the next location state logic 5033.

The next location state logic or circuit 5033 may function or operate as a state machine to realize transitions between three location states including an iTIM location state, an iCache plus way location state and an unknown state. In an implementation, the next location state logic 5033 may be in an unknown state upon initialization, due to boundary crossings from sequential instruction logic processing, due to branch or jump instruction type processing, due to branch misprediction or due to a cache miss. In an implementation, state transitions may occur based on inputs from the location state indicator 5030, branch resolution, branch prediction logic, sequential instruction logic processing and cache hit/miss processing. For example, the next location state logic 5033 may use feedback from the location state indicator 5030 from the previous instruction-fetch cycle to update the location state.

In an implementation, the next location state logic 5033 may use branch resolution information to update the location state. For example, the branch resolution information may include a branch misprediction event, a new program counter value and a new location state that may have been generated during the execute instruction stage as shown in FIG. 2. In an implementation, the next location state logic 5033 may use branch prediction logic to update the location state as described herein with respect to FIG. 6.

In an implementation, the next location state logic 5033 may include sequential instruction logic processing to update the location state. For example, the sequential instruction processing logic may determine if a program counter value may have gone beyond the address range of the current memory structure.

Figure 6:
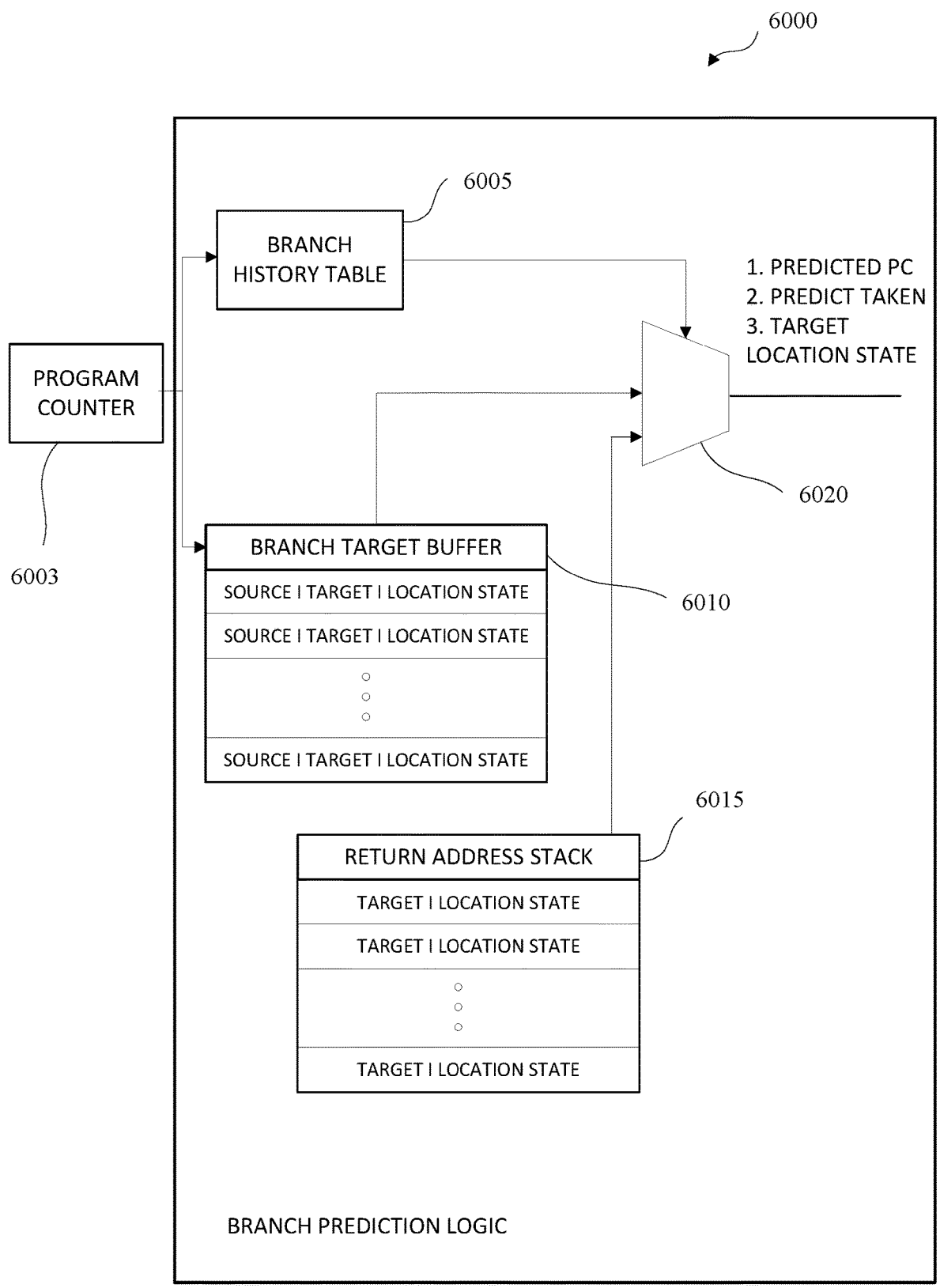
FIG. 6 is a diagram of an example flow and branch predictor in accordance with embodiments of this disclosure.

FIG. 6 is a diagram of an example flow and branch prediction logic, circuit or predictor 6000 in accordance with embodiments of this disclosure. In an implementation, the branch prediction logic 6000 may be part of the next location state logic 5033 as shown in FIG. 5. A program counter 6003 is an input to the branch prediction logic 6000. The branch prediction logic 6000 may include a branch history table

6005, a branch target buffer 6010, a return address stack 6015 and a multiplexor/selector 6020. The branch history table 6005 may store, for each branch instruction, a bit which indicates whether a branch was recently taken. The branch target buffer 6010 may store the source address, the target address of a predict taken branch and a location state of the target address. The return address stack 6015 may store a target address and a location state of the target address when a procedure call instruction may be executed. The return address of the call instruction may be pushed onto the stack and when the procedure call is finished, the procedure call will return to target address of the procedure call instruction. When a return instruction is executed, an address off the return stack is popped, and a prediction is made that the return instruction will return to the popped address. The branch prediction logic 6000 may operate and be implemented as a conventional branch predictor with the inclusion of the location state. For example, the multiplexor/selector 6020 receives the inputs from the branch history table 6005, the branch target buffer 6010 and the return address stack 6015 and selectively outputs branch prediction information including a predicted program counter value, predict branch taken, and a target location state. In an implementation, the output of the branch prediction logic 6000 may be used by the next location state logic 5033 and the next program counter logic 5027 to update location state and program counter value as appropriate.

Referring now also to FIG. 5, the program counter 5025 may retain the memory address of instructions as the instructions are fetched from memory and executed. The program counter 5025 may include an incrementer, a selector and a register. Upon decoding of a fetched instruction, the address of the next sequential instruction is formed by adding the byte length of the current instruction to the current program counter value using the incrementer and placing this next sequential instruction in the register. In the event a branch is taken, the address of the target instruction is selected by the selector instead of the incremented value and this target address is placed in the register. The program counter 5025 may be updated by the next program counter logic 5027.

The next program counter logic 5027 may use information from the program counter 5025, the branch prediction logic 6000 as shown in FIG. 6 and branch resolution information to selectively update the program counter 5025. In an implementation, the next program counter logic 5027 may update the program counter 5025 using the updated information.

In an implementation, the next program counter logic 5027 may use branch resolution information to update the program counter value. For example, the branch resolution information may include a branch misprediction event, a new program counter value and a new location state that may have been generated during the execute instruction stage as shown in FIG. 2. In an implementation, the next program counter logic 5027 may use branch prediction logic to update the program counter value as described herein with respect to FIG. 6.

The enable logic 5035 processes inputs from the program counter 5025 and the location state indicator 5030 and enables the iTIM for an iTIM state, the iCache and appropriate way for an iCache state, the iCache and all ways for an unknown state, or both the iTIM and iCache in the event of an unknown state. In an implementation, the activated iTIM 5020, or iCache 5015 and appropriate way may return the instruction for decoding in the decode instruction stage as shown in FIG. 2. In an implementation, in the event of a cache miss, the instruction may be obtained from main memory for example, and the next location state logic 5033 may be updated appropriately. In an implementation, the next location state logic 5033 may be set to unknown.

In an implementation, the enable logic 5035 may activate both memory structures when an unknown state is indicated and an appropriate memory structure may return the instruction for decoding in the decode instruction stage as shown in FIG. 2. In an implementation, the next location state logic 5033 may be updated appropriately. In this implementation, in the event of a cache miss, the instruction may be obtained from main memory for example, and the next location state logic 5033 may be updated appropriately.

Figure 7:
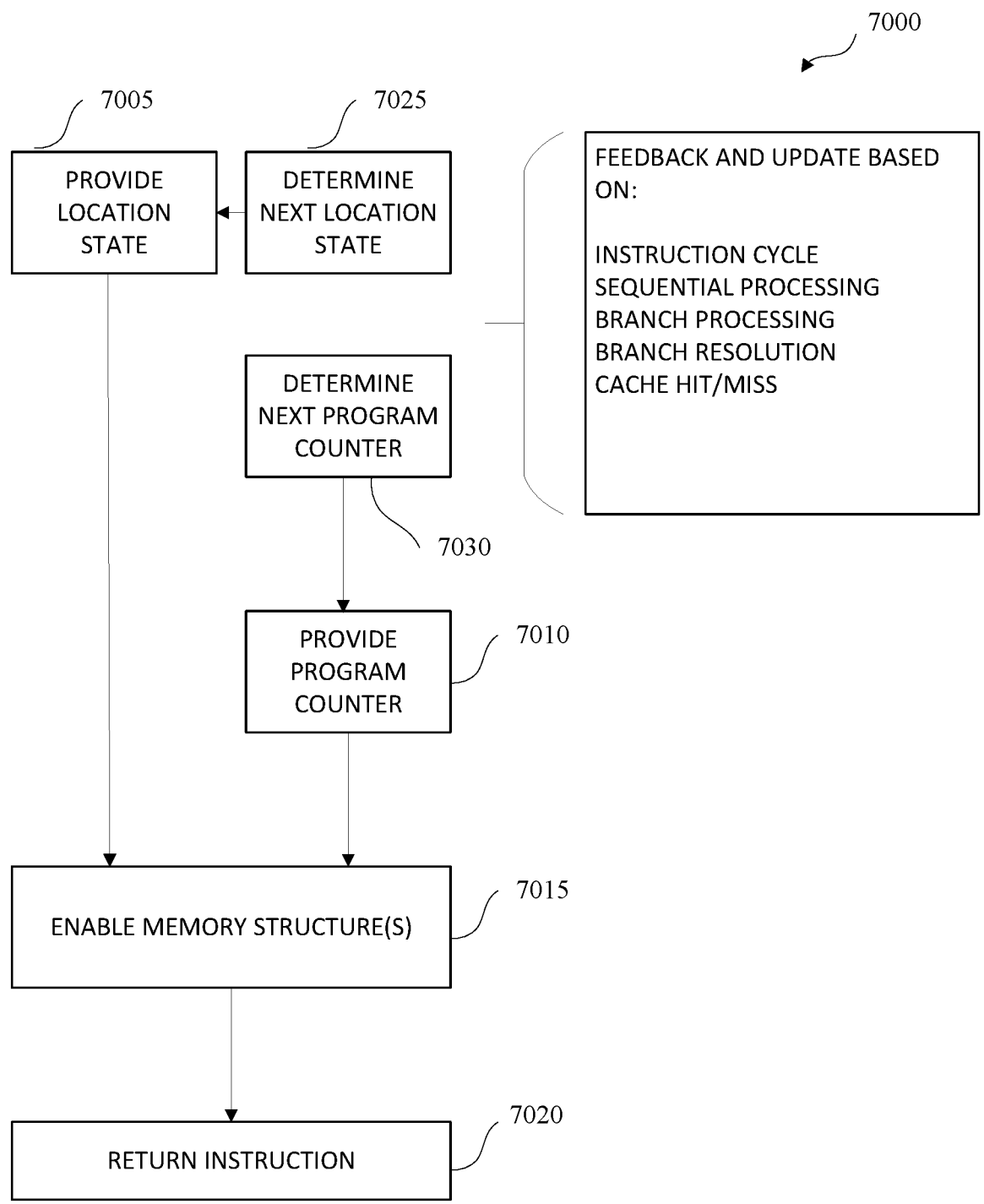
FIG. 7 is a diagram of an example technique for access prediction between an iTIM and an iCache as shown in FIG. 5 in accordance with embodiments of this disclosure.

FIG. 7 is a diagram of an example technique 7000 for access prediction between an iTIM and an iCache as shown in FIG. 5 and FIG. 6 and in accordance with embodiments of this disclosure. The technique includes: providing 7005 a location state for the current instruction cycle; providing 7010 a program counter value; enabling 7015 a memory structure(s) based on processing of the location state and the program counter value; returning 7020 an instruction; determining 7025 the location state; and determining 7030 the program counter value. The technique 7000 may be implemented using the processor 1000 of FIG. 1, the processor 3000 of FIG. 3 or the processor 5000 of FIG. 5.

The technique 7000 includes providing 7005 a location state for the current instruction-fetch cycle. In an implementation, the location state may be known or unknown. In an implementation, when the location state is known, the location state may indicate either the iTIM or the iCache and a particular way. In an implementation, when the location state is unknown, the location state may indicate the iCache and all ways, or both the iTIM and the iCache and all ways. The iTIM may be the iTIM shown for example in FIG. 1, FIG. 3, or FIG. 5, for example. The iCache may be the iCache shown for example in FIG. 1, FIG. 3, or FIG. 5, for example.

The technique 7000 includes providing 7010 a program counter value.

The technique 7000 includes enabling 7015 a memory structure(s) based on processing the location state and the program counter value. In an implementation, the memory structure enabled may be the iTIM. In an implementation, the memory structure enabled may be the iCache and a particular way. In an implementation, where the location state is unknown, the memory structure enabled may include the iCache with all ways enabled. In an implementation, where the location state is unknown, the memory structure enabled may include the iTIM and the iCache with all ways enabled.

The technique 7000 includes returning 7020 an instruction. In an implementation, the instruction may be returned from an enabled and known memory structure. For example, in the event the location state was known, the instruction may be returned from the iTIM or the particular way in the iCache. In an implementation, the instruction may fail to return from an enabled and known memory structure and may be returned from main memory or some other memory hierarchy, for example. In this instance, the enabled and known memory structure may be the iCache and there was a cache miss. In an implementation, the instruction may be returned from an enabled memory structure. For example, in the event the location state was unknown, the instruction may be returned from one of the iTIM or a way in the iCache. In an implementation, the instruction may be returned from memory not including the iTIM and the iCache, for example, main memory or some other memory hierarchy.

The technique 7000 includes determining 7025 the next location state. In an implementation, the location state may be updated each instruction-fetch cycle with feedback regarding the location state. In an implementation, the location state may be updated based on sequential instruction processing as described herein. In an implementation, the location state may be updated based on branch processing as described herein. In an implementation, the location state may be updated based on branch resolution as described herein. In an implementation, the location state may be updated based on cache hit/miss processing as described herein. The next location state may be determined based on the provided updates and the location state may be updated.

The technique 7000 includes determining 7030 the next program counter. In an implementation, the program counter value may be updated each instruction-fetch cycle. In an implementation, the program counter value may be updated based on branch processing as described herein. In an implementation, the program counter value may be updated based on branch resolution as described herein. The next program counter value may be determined based on the provided updates and the program counter value may be updated accordingly.

In general, a processor includes an instruction tightly-coupled memory (iTIM), an instruction cache (iCache) with N-ways, where N is at least one, and an access prediction logic. The access prediction logic is configured to predict which of the iTIM or the iCache and a particular way to fetch an instruction from, enable the predicted iTIM or the iCache and a particular way based on a location state and a program counter value, and feedback the location state and the program counter value to predict a next location state for a next instruction, where the processor is configured to fetch the instruction via the enabled iTIM or the iCache and the particular way. In an implementation, the access prediction logic is further configured to set the location state to at least one of the iTIM or the iCache and the particular based on at least the program counter value. In an implementation, the access prediction logic is further configured to set the location state to a currently enabled iTIM or iCache and particular way for the next instruction when a next program counter value is within an address range of the enabled iTIM or iCache and particular way. In an implementation, the access prediction logic is further configured to set the location state to an appropriate iTIM or iCache and a particular way for the next instruction when a next program counter crosses a boundary defined by an address range of the currently enabled iTIM or iCache and particular way. In an implementation. the access prediction logic is further configured to set the location state to an appropriate iTIM and the iCache and all N ways for the next instruction when a next program counter crosses a boundary defined by an address range of the currently enabled iTIM or iCache and particular way. In an implementation, the access prediction logic is further configured to set the location state to the iCache and a different way for the next instruction in the event of a cache way miss. In an implementation, the access prediction logic is further configured to set the location state to the iTIM and the iCache and all N ways for the next instruction in the event of a cache miss. In an implementation, the access prediction logic is further configured to, for the next instruction in the event of a branch misprediction, set the location state to the iCache and all N ways or both the iTIM and the iCache and all N ways. In an implementation, the access prediction logic predicts the location state based on at least branch resolution processing, branch prediction processing, sequential instruction logic processing, cache hit/miss processing, a previous program counter value and a previous location state.

In general, a method for predicting between memory structures, the method includes providing a location state, providing a program counter value, predicting which one of an instruction tightly-coupled memory (iTIM) or an instruction cache (iCache) with a particular way of N-ways to fetch an instruction from, enabling activation of the predicted iTIM or the iCache and a particular way based on a location state and a program counter value, feeding back the location state and the program counter value to predict a next location state for a next instruction, and returning an instruction. In an implementation, the method further includes setting the location state to at least one of the iTIM or the iCache and the particular based on at least the program counter value. In an implementation, the method further includes setting the location state to a currently enabled iTIM or iCache and particular way for the next instruction when a next program counter value is within an address range of the enabled iTIM or iCache and particular way. In an implementation, the method further includes setting the location state to an appropriate iTIM or iCache and a particular way for the next instruction when a next program counter crosses a boundary defined by an address range of the currently enabled iTIM or iCache and particular way. In an implementation, the method further includes setting the location state to an appropriate iTIM and the iCache and all N ways for the next instruction when a next program counter crosses a boundary defined by an address range of the currently enabled iTIM or iCache and particular way. In an implementation, the method further includes setting the location state to the iCache and a different way for the next instruction in the event of a cache way miss. In an implementation, the method further includes setting the location state to the iTIM and the iCache and all N ways for the next instruction the event of a cache miss. In an implementation, the method further includes, for the next instruction in the event of a branch misprediction, setting the location state to the iCache and all N ways or both the iTIM and the iCache and all N ways. In an implementation, where the predicting is based on at least branch resolution processing, branch prediction processing, sequential instruction logic processing, cache hit/miss processing, a previous program counter value and a previous location state.

In general, a processor includes an instruction tightly-coupled memory (iTIM), an instruction cache (iCache) with N-ways, where N is at least one, a program counter configured to store a program counter value, a location state indicator configured to store a location state, and an enable circuit configured to enable one of the iTIM or the iCache and a particular way based on the location state and the program counter value, where the processor is configured to fetch the instruction via the enabled iTIM or the iCache and the particular way. In an implementation, further including a next location state logic configured to set the location state to at least one of the iTIM or the iCache and the particular way based on at least branch resolution processing, branch prediction processing, sequential instruction logic processing, cache hit/miss processing, a previous program counter value and the previous location state.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A processor, comprising:
   an instruction tightly-coupled memory (iTIM);
   an instruction cache (iCache) with N ways, where N is at least one;
   a location state indicator configured to:
      store an instruction fetch location to be enabled; and
      indicate whether the instruction fetch location is known or unknown; and
   an access prediction logic configured to:
      predict which of the iTIM or the iCache and a particular way to fetch an instruction from based on the location state indicator and a program counter value;
      when the location state indicator indicates that the instruction fetch location is known, enable the predicted iTIM or the predicted iCache and flail the particular way;

when the location state indicator indicates that the instruction fetch location is unknown, enable both the iTIM and all N ways of the iCache for parallel access; and, update the location state indicator and the program counter value to predict a next location state for a next instruction, wherein the processor is configured to fetch the instruction via the enabled iTIM, the enabled iCache and the particular way, or the enabled iCache and all N ways.

2. The processor of claim 1, wherein the access prediction logic is further configured to:

set the instruction fetch location in the location state indicator to at least one of the iTIM or the iCache and the particular way based on at least the program counter value.

3. The processor of claim 1, wherein the access prediction logic predicts the instruction fetch location in the location state indicator based on at least: branch resolution processing, branch prediction processing, sequential instruction logic processing, cache hit/miss processing, a previous program counter value and a previous location state.

4. A method for predicting between memory structures, the method comprising:

providing a location state indicator which stores an instruction fetch location to be enabled and indicates whether the instruction fetch location is known or unknown;

providing a program counter value;

predicting which one of an instruction tightly-coupled memory (iTIM) or an instruction cache (iCache) with a particular way of N ways to fetch an instruction from based on the location state indicator and the program counter value;

enabling activation of the predicted iTIM or the predicted iCache and flail the particular way when the location state indicator indicates that the instruction fetch location is known;

enabling activation of both the iTIM and all N ways of the iCache for parallel access when the location state indicator indicates that the instruction fetch location is unknown;

updating the location state indicator and the program counter value to predict a next location state for a next instruction; and returning an instruction via the enabled iTIM, the enabled iCache and the particular way, or the enabled iCache and all N ways.

5. The method of claim 4, further comprising:

setting the instruction fetch location in the location state indicator to at least one of the iTIM or the iCache and the particular way based on at least the program counter value.

6. The method of claim 4, wherein the predicting the instruction fetch location in the location state indicator is based on at least: branch resolution processing, branch prediction processing, sequential instruction logic processing, cache hit/miss processing, a previous program counter value and a previous location state.

7. A processor, comprising:

an instruction tightly-coupled memory (iTIM);

an instruction cache (iCache) with N ways, wherein N is at least one;

a program counter configured to store a program counter value;

a location state indicator configured to store an instruction fetch location to be enabled and an indication whether the instruction fetch location is known or unknown; and an enable circuit configured to:

enable one of the iTIM or the iCache and a particular way based on the location state indicator and the program counter value when the location state indicator indicates that the instruction fetch location is known; and enable both the iTIM and all N ways of the iCache when the location state indicator indicates that the instruction fetch location is unknown, wherein the processor is configured to fetch the instruction via the enabled iTIM, the enabled iCache and the particular way, or the enabled iCache and all N ways.

8. The processor of claim 7, further comprising:

a next location state logic configured to set the instruction fetch location in the location state indicator to at least one of the iTIM or the iCache and the particular way based on at least: branch resolution processing, branch prediction processing, sequential instruction logic processing, cache hit/miss processing, a previous program counter value, and a previous location state.

* * * * *